UNITED STATES PATENT OFFICE.

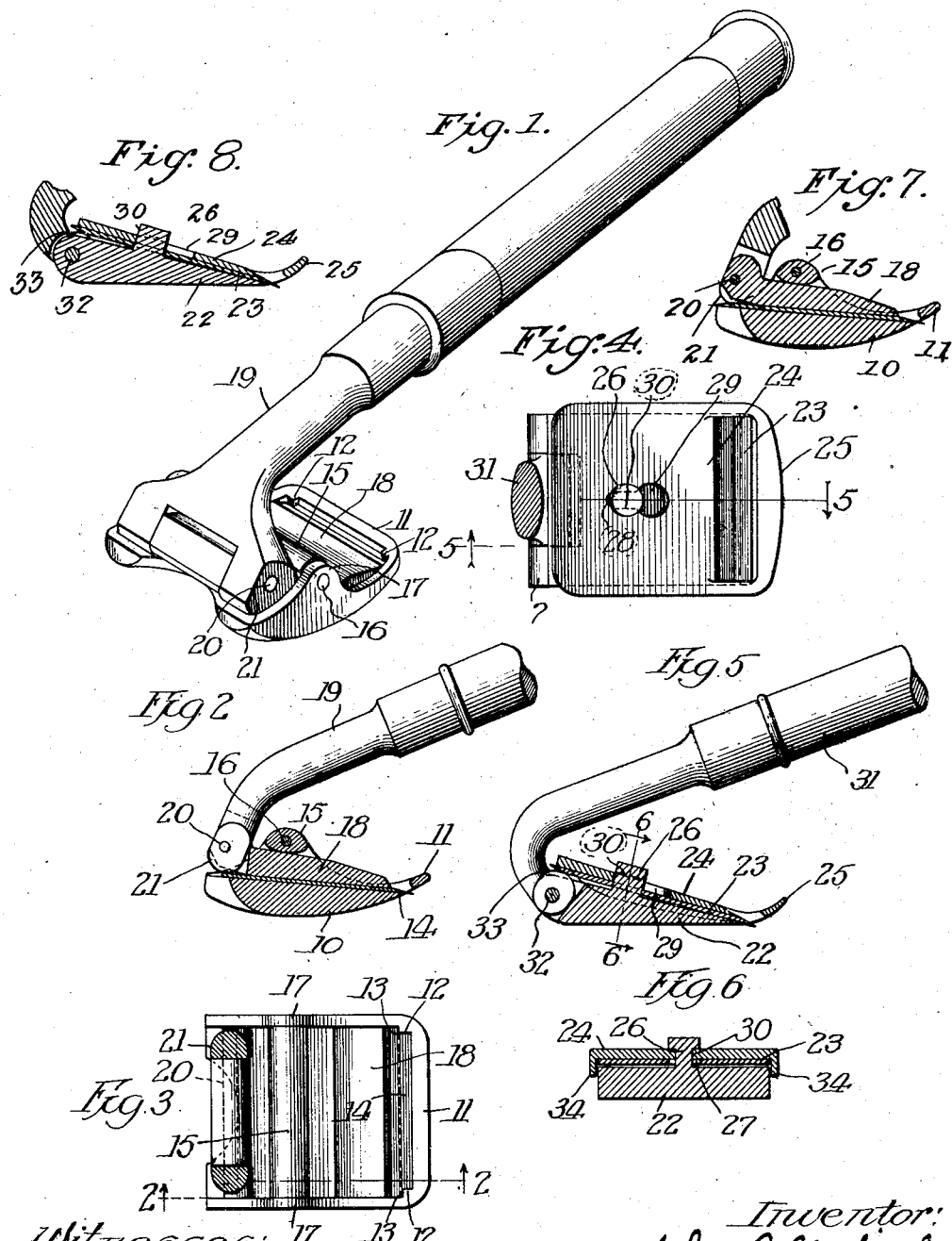

JOHN A. MAKARHOF, OF CHICAGO, ILLINOIS, ASSIGNOR, BY DIRECT AND MESNE ASSIGNMENTS, OF FORTY-NINE ONE-HUNDREDTHS TO FRED R. BELT AND FIFTY-ONE ONE-HUNDREDTHS TO GEORGE A. BAIRD, BOTH OF CHICAGO, ILLINOIS.

SAFETY-TRIMMER FOR CORNS AND CALLI.

1,016,343.  Specification of Letters Patent.  Patented Feb. 6, 1912.

Application filed April 5, 1911. Serial No. 619,070.

*To all whom it may concern:*

Be it known that I, JOHN A. MAKARHOF, a citizen of the United States, residing at Chicago, in the county of Cook and State of Illinois, have invented certain new and useful Improvements in Safety-Trimmers for Corns and Calli, of which the following is a specification.

This invention relates to improvements in safety trimmers for corns and calli and aims to provide a device of this character which shall be simple in construction, which shall consist of but few parts, which can be readily assembled for use and taken apart to remove the blade and which shall be strong and durable and cheap to manufacture.

Other objects and advantages of the invention will become apparent as it is better understood by reference to the following description when taken in connection with the accompanying drawings throughout the various views of which like reference characters denote similar parts.

Referring to the drawings—Figure 1 is a perspective view of a trimmer illustrating one embodiment of my invention. Fig. 2 is a longitudinal sectional view on the line 2—2 of Fig. 3. Fig. 3 is a plan view with the handle broken away. Fig. 4 is a plan view of another form of my invention. Fig. 5 is a longitudinal sectional view taken on the line 5—5 of Fig. 4. Fig. 6 is a transverse sectional view taken on the line 6—6 of Fig. 5. Fig. 7 is a central longitudinal sectional view of the embodiment of the invention shown in Figs. 1 and 2; and Fig. 8 is a central longitudinal sectional view of the embodiment of the invention shown in Figs. 4 and 5.

Referring now more particularly to that embodiment of my invention disclosed in Figs. 1 to 3 inclusive, 10 designates a guard member in the present instance shaped to slide along the surface of the part to be cut and provided with a forwardly projecting guard 11 which serves to prevent the blade from cutting too deeply. The guard is provided at each side with a shoulder 12 against which the shoulders 13 formed by cutting away the forward corners of the blade 14 are adapted to abut, thus fixing the distance which the cutting edge of the blade may project beyond the guard member and insuring that both sides of the blade project equal distances so that a uniform cutting edge is presented. A transverse bar 15 is secured by a rod 16 to the upwardly projecting portions or lugs 17 at the sides of the guard member. This transverse bar, if preferred, however, may be made integral with the guard member, it being necessary only that the bar be spaced from the upper face of the guard member a sufficient distance to permit the introduction of the blade retaining member 18 between the lower face of the bar and the upper face of the blade 14 positioned upon the guard member.

The blade retainer 18 is made independent from the guard member and may be slipped into operative position between the body of the guard member and the transverse rod from the rear after the blade has been placed in position. A forked handle 19 is pivotally secured by a pin 20 to the sides of the retainer adjacent the rear end thereof and the lower ends of the forks of the handle are shaped to form cams 21 adapted, when the handle is moved to the position shown in Figs. 1 and 2, to engage with the upper face of the blade 14 and elevate the rear end of the retainer relatively to the guard member, thus, by reason of the engagement of the upper face of the retainer intermediate its ends with the transverse bar 15, forcing the forward end of the retainer downwardly to clamp the blade adjacent its cutting edge between the retainer and the guard member. The cams are preferably so shaped that when the handle is in operative position, as shown, the highest points of the cams have been moved to a position beyond engagement with the blade, so that any tendency of the handle to move relatively to the retainer and release the blade is overcome. In assembling this embodiment of my invention the blade is first positioned on the guard member with the shoulders 13 engaging the shoulders 12 so that the cutting edge of the blade projects the proper distance beyond the guard and then the retainer is introduced beneath the transverse bar, the handle being turned back to bring the cams 21 above the lower face of the retainer. After the retainer has been inserted the handle is turned forwardly about its pivot to the position shown in the drawings, this movement forcing the cams 21 into engagement with the upper face of the blade near the rear end thereof and thereby separating the rear ends of the retainer and guard member and swinging their forward ends together to securely and rigidly clamp the blade in position.

In the form shown in Figs. 4 to 6 inclusive, the retainer 22 is disposed beneath, instead of above, the blade 23 and the guard member 24, provided with a forwardly extending guard 25, is positioned over the blade. The retainer is provided, in this instance, with an upwardly projecting integral stud 26 and the blade is provided with a perforation 27 adapted to fit over the stud thereby limiting the distance that the cutting edge of the blade may project beyond the forward edge of the retainer and the guard. The sides of the stud are undercut as indicated at 26, Fig. 6, and the guard member is provided with a perforation 29 adapted to fit over the stud and extending into a radial slot 30, the side-walls of which are adapted to engage beneath the head on the stud formed by the undercut portions, to form a rocking connection between the guard member and the retainer. The handle 31 is pivoted on a pin 32 to the rear end of the retainer and is provided with a cam 33 adapted to engage beneath the blade and force the blade and the rear end of the guard member away from the rear end of the retainer thereby clamping the blade adjacent its cutting edge between the front end of the retainer and the guard member when the handle is moved into the operative position shown in Fig. 5. The guard member is provided with laterally downwardly extending flanges 34 which serve to aline the blade between the guard member and the retainer and insure that both sides of the cutting edge of the blade project the same distance beyond the guard. In assembling this embodiment of my invention the blade is first slipped over the stud 26 then the guard member is placed in position by introducing the stud through the perforation 29 and moving the guard member longitudinally to engage the side-walls of the slot 30 beneath the head of the stud. The handle, of course, must be turned back into inoperative position to bring the cam 33 below the upper face of the retainer in order to permit the blade and guard member to be placed in position on the stud. After the parts have been assembled, as described, the handle is turned forwardly on its pivot to the position shown, thus bringing the cam into engagement with the face of the blade adjacent its rear edge and forcing the rear end of the retainer away from the blade and guard member to clamp the forward portion of the blade adjacent its cutting edge between the guard member and retainer. In either embodiment of my invention the blade may be readily removed by turning the handle backwardly to release the cam whereupon the retainer may be separated from the guard member permitting the blade to be removed.

It is believed that the invention and many of its advantages will be understood from the foregoing without further description and it will be obvious that various minor mechanical changes may be resorted to in the construction of the device without departing from the spirit or sacrificing any of the material advantages of the invention.

I claim:

1. A device of the character described, including clamping members, a blade held between said members, a fulcrum bearing for the members located between the front and rear of the blade, and means located in rear of said fulcrum bearing for relatively tilting of the members upon the fulcrum bearing to separate the rear ends of the members and to swing together the front ends of the members to clamp the blade therebetween adjacent the cutting edge of the blade, said means engaging the rear portion of the blade to hold it against one of the members.

2. A device of the character described comprising a pair of clamping members adapted to receive a blade therebetween, one of the members being provided at its rear with an opening to expose a portion of the blade, a fulcrum bearing for the members located between the front and rear of the members, and means carried by said one member and working in the opening thereof for engagement with that portion of the blade exposed by the opening to clamp the blade against the other member and to effect relative tilting of the members upon the fulcrum bearing to swing together the front ends of the members and clamp the same upon the blade adjacent its cutting edge.

3. A device of the character described, comprising clamping members, a blade held between said members, a fulcrum bearing for the members located between the front and rear of the members, and a swinging handle for manipulating the device terminating in a cam located in rear of the fulcrum bearing, pivoted upon one of the members and bearing against the blade to hold it against the other member and to separate the rear ends of the members and swing together the front ends of the members to clamp the blade therebetween adjacent the cutting edge of the blade.

4. A device of the character described comprising a pair of clamping members adapted to receive a blade therebetween, one of the members being provided at its rear with an opening to expose a portion of the blade, a fulcrum bearing for the members located between the front and rear of the members, and a handle for manipulating the device terminating in a cam pivoted in the opening in the said one member for engagement with that portion of the blade exposed by the opening to clamp the blade against the other member and to effect tilting of the members upon the fulcrum bearing to separate the rear ends of the members and to swing together the front end of the members and clamp the same upon the blade adjacent its cutting edge.

5. A device of the character described, comprising a pair of clamping members, a fulcrum bearing for the members located between the front and rear of said members, and a handle for the device provided at one end with an elbow terminating in a cam having its axis disposed transversely of the device and pivotally mounted upon one of the members and operating to relatively tilt the members upon the fulcrum bearing to separate the rear ends of the members and to swing together the front ends of the members to clamp a blade between them adjacent the cutting edge of the blade, said handle being disposed at an acute angle to the members and extending in front thereof in the clamped position of the handle, substantially as described.

JOHN A. MAKARHOF.

Witnesses:
WM. O. BELT,
M. A. KIDDIE.